Sept. 27, 1955      O. C. KOPPEN      2,719,014

HIGH-LIFT AIRPLANE WITH ALL-MOVING TAIL UNIT

Filed July 30, 1954      2 Sheets-Sheet 1

INVENTOR.

Otto C. Koppen

*INVENTOR.*
*Otto C. Koppen*

United States Patent Office 2,719,014
Patented Sept. 27, 1955

2,719,014

HIGH-LIFT AIRPLANE WITH ALL-MOVING TAIL UNIT

Otto C. Koppen, Wellesley, Mass., assignor to Helio Aircraft Corporation, Canton, Mass., a corporation of Delaware Application July 30, 1954, Serial No. 446,723

6 Claims. (Cl. 244—13)

This invention relates to fixed-wing powered aircraft, and provides means for longitudinal and lateral control for airplanes having high lift wings and that are capable of low speed flight.

In the course of the development of fixed-wing aircraft, attempts have been made to build aircraft capable of low speed flight while at the same time being capable of cruising speeds equivalent to those of conventional airplanes of the same power loading. Typical of earlier attempts were the Curtiss "Tanager," the McDonnell "Doodlebug," the Fiesler "Storch" and, more recently, the Stinson "L–1."

That the ability to fly and manuever at low speeds without material reduction of an acceptable cruising speed has great advantages from the standpoints of safety and small field operation, has long been recognized. However these very desirable characteristics have never before been available to users of aircraft. The reason for the prior neglect of desirable low speed characteristics has been that although it has been relatively easy to provide the lift force necessary to produce low-speed flight, until the present invention the combination of sufficient lateral and longitudinal control has not been available to make full use of the low speed characteristics. Particularly, tight turns at minimum speed and/or rapid changes of trim required by power change heretofore could not be made.

The present invention provides a long-sought solution for these problems whereby both satisfactory lateral and longitudinal control are provided at low minimum speeds (as well as at all higher speeds) with resultant critical improvement in safety and low speed performance, power-on or power-off, and with rapid changes from one to the other.

In the drawings, which show a typical preferred embodiment of the invention in a single engine airplane (though also applicable to multi-engine airplanes):

Figure 1:
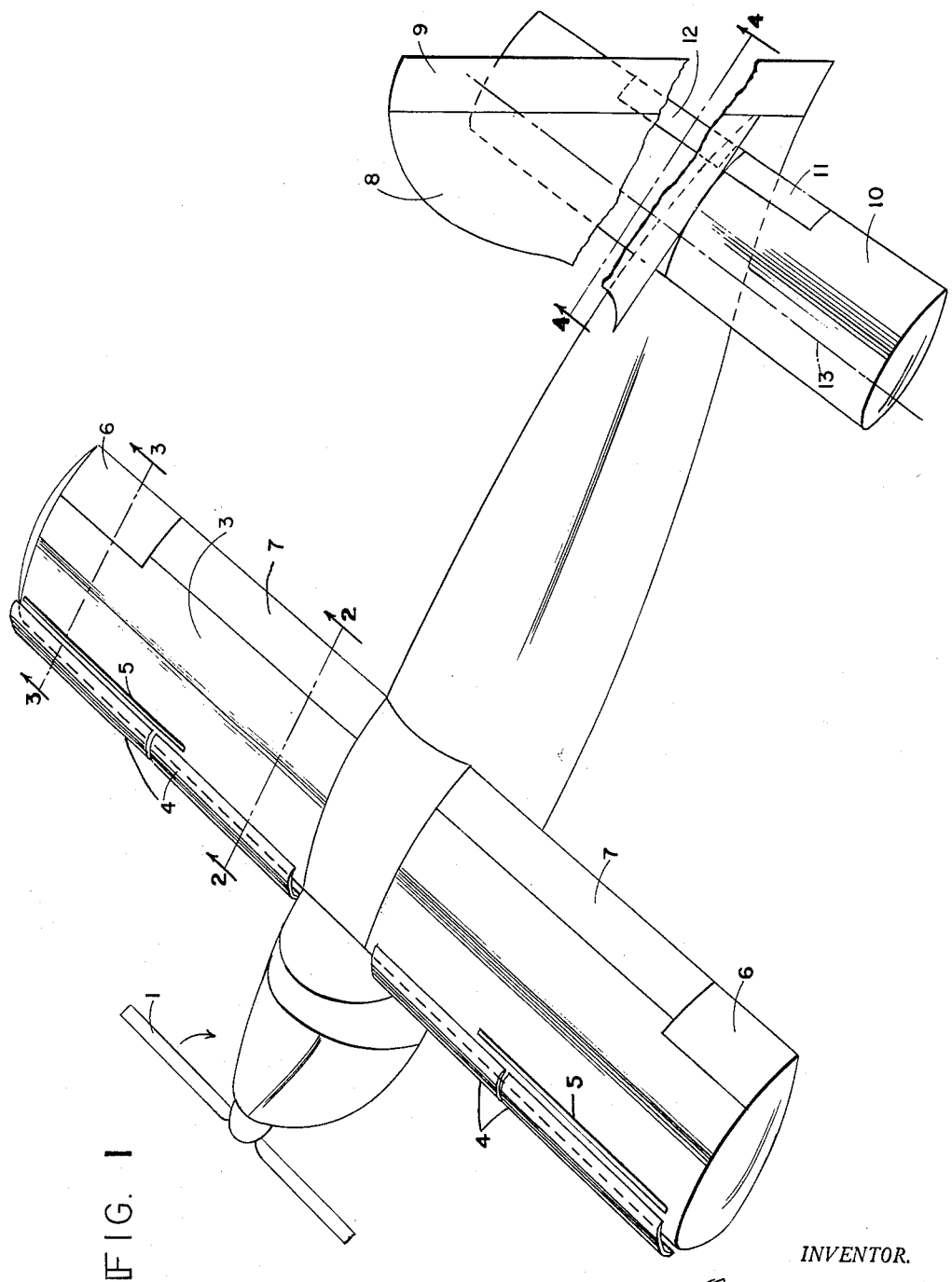
Fig. 1 is an isometric view illustrating the embodiment of the invention in such an airplane, certain parts including the landing gear having been omitted for purposes of clarity.
Figure 2:
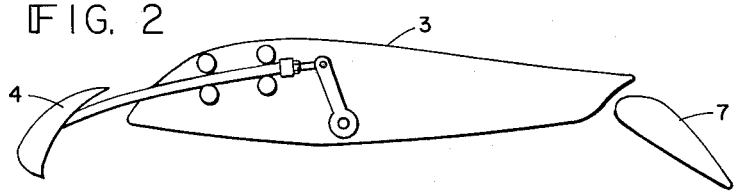
Fig. 2 is a diagrammatic cross-section of the wing at section 2—2 showing the slot and the flap in the high-lift position.

In the drawings, like numerals represent like parts. Referring to the airplane, Fig. 1, the high lift wing 3 (having a lift coefficient of at least 2.5 and preferably higher) as required for low speed flight (e. g. of the order of 30 m. p. h.) is produced by the full-span automatically operating slats 4, and the long span slotted flaps 7 controllable through conventional means (not shown). The lateral control, through a rock-shaft 5a (one for each wing) constituting lateral control operating means, is by the linked interceptors 5 and short span ailerons 6 operated through a conventional common control means, stick or wheel (not shown), yawing control by rudder 9 hinged to vertical fin 8, and the longitudinal trim and pitch control by the all-moving unitized horizontal tail (elevator) 10 rotatable about its axis 13 through fixedly attached lever 10a by said conventional stick or wheel common control means (not shown), manual or automatic, and pitch control operating means 10b connected to said lever 10a. Tab 11 is provided for longitudinal trim and is operated by conventional means. Anti-balance tab 12 is used to provide elevator hinge moment.

The general relationship of wing, body and tail so far described is conventional. However, the novel lateral and longitudinal control combination therewith of the present invention offers a great advantage over prior conventional ailerons and horizontal tail arrangements consisting either of an adjustable stabilizer and an elevator, or a fixed stabilizer and an elevator with an adjustable trim tab.

As is well known to those familiar with the art, the control-induced yawing moment, the adverse yawing moment due to rolling velocity, and the adverse rolling moment due to yawing velocity, are all proportional to lift coefficient, the latter being defined as $$\frac{\text{Wing loading in lbs./sq. ft.}}{\text{Dynamic pressure}}$$

Moreover, in the commonly used types of lateral control, the control profile yawing moment is also adverse. In addition, in the flap type of lateral control, the rolling moment coefficient, defined as $$\frac{\text{Rolling moment in ft. lbs.}}{\text{Span} \times \text{dynamic pressure} \times \text{wing area}}$$

is non-linear with lift coefficient, falling off sharply at the higher lift coefficients. However, high lift coefficient airplanes and particularly those with moderate wing loadings (e. g. 8–15 lbs./sq. ft.) designed for low-speed flight, require high rolling moment coefficients at high-lift coefficients because the rolling velocity is proportional to the forward speed of the airplane and the lower the forward speed, the lower the rate of roll for a given rolling moment coefficient. For these reasons the conventional, simple flap type of aileron is completely inadequate for high-lift coefficient airplanes, particularly those designed to have low minimum speeds.

On the other hand, a lift-destroying type of lateral control provides a rolling moment proportional to lift coefficient and at the same time provides a favorable yawing moment. Lift-destroying lateral controls may be of either of two types, the interceptor or the spoiler. The interceptor is designed to destroy lift of lifting elements that lie forwardly of the mounting on the airplane of the interceptor device whereas a spoiler destroys the lift of the wing rearwardly of a spoiler. Consequently, the interceptor is effective only when used in conjunction with a leading edge slat as employed in the airplane of this invention. Without the slat it becomes but a spoiler having a poor location in relation to time lag, that is, its effect is delayed, even dangerously.

My preferred construction involves an interceptor of the circular-arc type and located adjacent to the trailing edge of the slat when the slat is in the retracted position. The span of the interceptor should be approximately 30–50% (preferably 40%) of the semi-span of the wing, be located at the outboard extremity of the wing, be so constructed and actuated as to provide a maximum projection of the order of approximately 4 to 7% (preferably 5%) of the wing chord. Since the circular-arc type of surface produces no hinge moment, I provide, in addition, conventional ailerons of say approximately 22% of the semi-span linked to the interceptors primarily to provide the necessary control feel at all speeds and be aerodynamically self-centering. The linkage should be such that no sudden change of applied force is required when the rolling control is moved by the pilot from one extreme to the other.

Figure 3:
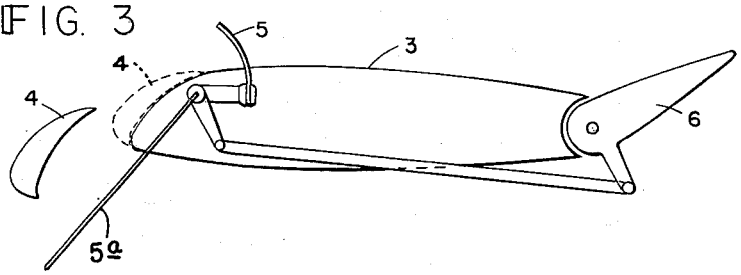
Fig. 3 is a diagrammatic cross-section of the wing at section 3—3 showing the interceptor and the aileron in the position for maximum rolling moment.

Referring to Fig. 3, my preferred interceptor 5 is projected outside of the wing 3 only when the aileron 6 is in a position above neutral. However, when the aileron is depressed, the interceptor rotates within the wing and a continuous, smooth control motion is produced.

Alternatively, a flap type of interceptor, with its hinge adjacent to the trailing edge of the retracted slat can be used with the same effect as to rolling moment. However, the aerodynamic hinge moment of such a device is large and difficult to compensate and it is also difficult to produce a control system that does not have an undesirable change of momentum (or pilot force required) when the rolling control is moved through its neutral position.

Further, with the lateral control in neutral position, the top edge of interceptor 5 should be lower than the upper surface of the wing so that the aileron 6 is allowed approximately 5 degrees of up travel before the interceptor projects above the wing surface. This allows for normal minor lateral trimming by the ailerons 6 without creation of drag by interceptor and I have found in practise that it also avoids a short period lateral oscillation caused by the elasticity of the control system in rough air.

With the lateral control system as described, I have found in actual flight with an airplane of this invention that the lateral control, at a maximum lift coefficient of approximately 2.65 and a speed of approximately 30 M. P. H., is ample rapidly to maneuver the airplane in roll at its minimum radius of turn for such speed. Moreover, it is possible, with the rolling control only, to reverse a turn at minimum speed against full opposite rudder. This is a major safety feature since the greatest number of fatalities in fixed-wing aircraft are caused by a loss of lateral control at low speed (as by crossing of aileron and rudder controls).

The various elements of the above described lateral control system are individually old in the art. However, the improved lateral control system of this invention is of little importance unless combined in accordance with this invention with the longitudinal control system now to be described.

That a high-lift coefficient wing as here employed will produce a high downwash angle is fundamental. Moreover, it is well known that a propeller slipstream when suddenly applied will produce a local and abrupt change of downwash which is a function of both the thrust and the lift coefficients. The thrust coefficient is here defined as $$\frac{\text{Thrust in pounds}}{\text{Wing area} \times \text{dynamic pressure}}$$

The lower the speed of the aircraft the higher the thrust at any given power setting. Low-speed, high maximum lift-coefficient airplanes consequently experience the greatest changes of wing downwash due to propeller slipstream-wing interaction. If maximum advantage is to be taken of the characteristics of a high lift wing in performing the type of maneuvers such a wing makes possible, very rapid changes of thrust, and therefore of downwash, must be compensated for by the horizontal tail.

The conventional stabilizer-elevator constructions can be designed to cope with the steady-state wing pitching moment coefficient and downwash angles at high-lift coefficients. However, large changes of stabilizer settings are required for an adequate range of trim. Conventional stabilizer adjustments, unlike elevator movements, are slow of accomplishment and consequently cannot be employed for required rapid critical changes of trim in rapid maneuvers involving sudden power changes.

If the high-lift wing is to be fully utilized, the airplane must be capable of being abruptly (but still safely) maneuvered at minimum speed. To maneuver rapidly, large changes in power settings are frequently necessary and the longitudinal control system must be capable of instantly counteracting large downwash changes due to the changes of slipstream velocity caused by resultant thrust changes. The conventional stabilizer-elevator combinations are wholly inadequate to rapidly compensate for large changes in trim in a high lift airplane such as here involved.

However, I have found that, in combination with the above described high-lift wing and lateral control system, an all-moving unitized horizontal tail consisting of a control surface rotatable as a unit about an axis slightly ahead of its aerodynamic center, operating in conjunction with a linked anti-balance tab, is adequate to enable the pilot rapidly to compensate for all trim changes and at the same time satisfy all other control and stability requirements, such as free control longitudinal stability in all flight conditions as required by the Civil Aeronautics Authority (U. S. A.).

Figure 4:
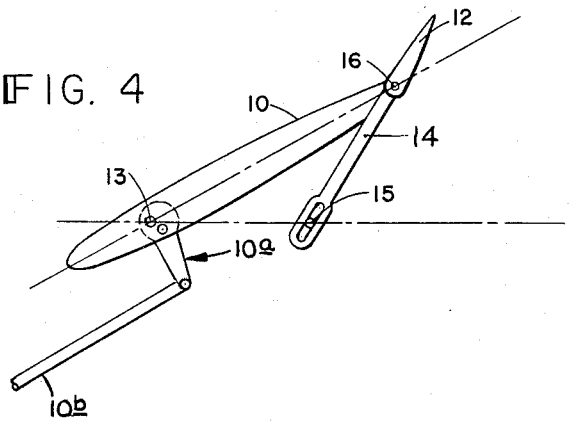
Fig. 4 is a diagrammatic cross-section of the horizontal tail at section 4—4 showing the same in a displaced position.

Specifically, referring to the longitudinal control means of the airplane of this invention and to Fig. 4, the tail surface 10 is mounted for rotation through fixedly attached lever 10a and pitch control operating means 10b about the fixed axis 13. An anti-balance tab 12 is attached to the tail surface 10 at the hinge 16 for the purpose of providing control feel to the elevator. Arm 14 is rigidly attached to the tab 12 and is restrained at its slotted forward end by pin 15 which is fixedly attached to the airplane structure. The relative positions of pin 15 and elevator axis 13 fix the tab-to-elevator linkage ratio. A variation of the hinge position 13 with relation to the elevator chord and the fore and aft position of pin 15 with relation to 13, provides the designer with a wide choice of hinge moments due to tail angle of attack, and tail deflection angle. A wide choice of stability and hinge moment characteristics are thus available to the designer. Without the linked tab 12, if hinge 13 is placed at the aerodynamic center of the surface the pilot control force would be zero for all elevator angles. Moreover, this preferred position (at the aerodynamic center) provides the most desirable steady-state or static stability characteristics. However, to maintain such most desirable stability characteristics and at the same time provide acceptable and desirable control forces for purposes of feel, an anti-balance tab 12 is here used, and similarly adjusted by pin 15 in relation to axis 13, to achieve such desired control force characteristics and, it is found, without introducing undesirable stability characteristics. Typically, pin 15 should bear such a relation to pin 13 that the rate of angular motion of the tab is approximately 1½ times that of the elevator. A larger tab however requires that the pin 15 be placed somewhat closer to the axis 13, and vice versa with a smaller tab. Prior adjustable horizontal tail arrangements are wholly impractical for rapid tail-angle adjustments so vital in a low speed high lift airplane, because the maximum change of the zero lift angle of such arrangements, available to the pilot, is aerodynamically limited. For instance, for a commonly used ratio of elevator area to total horizontal tail area of 45% the maximum change of tail zero lift angle that can be attained is less than 15°+ or —. The horizontal all-moving unitized tail of the present invention has no such limitation for, since its zero lift line always lies in the chord line, as large a lift angle as necessary or desired (e. g. 30° or more, + or —) can be obtained, and with no mechanical limitations.

In my airplane with the combination of lateral and longitudinal control described above, I have found in actual practice in an airplane having a speed range of the order of five to one, that it is possible fully to utilize the performance potential of a high-lift wing having a lift coefficient of the order of 2.5 or more and to take full advantage of the additional safety in flight afforded by such high lift and the low speed maneuverability characteristics as set forth above. Also, it is found that the invention makes possible not only full lateral and longitudinal control at the very low minimum level flight speeds referred to but also at even lower speeds than that at which the airplane will sustain level flight, thus making possible a substantially level attitude in sinking condition as such lower speeds, a very great additional safety factor.

I claim:

1. In a fixed-wing powered airplane having a maximum lift coefficient of the order of 2.5 or more and capable of low-speed flight, in combination, lift-destroying lateral control means and lateral control operating means therefor, pitch control means and pitch control operating means therefor, said pitch control means including an all-moving unitized horizontal tail providing free control longitudinal stability, said horizontal tail being rotatable as a unit about a transverse horizontal axis and always having coincident zero lift and chord lines, whereby the greatest and most rapid changes of wing down-wash due to propeller slipstream-wing interaction power-on and power-off, at low air speed high lift-coefficient flight conditions may be rapidly and directly compensated for by a single movement of said pitch control operating means, said combination of control means providing full lateral and longitudinal control and maneuverability at all air speeds.

2. An airplane as claimed in claim 1 having, in addition, aileron lateral control means linked to said lift-destroying lateral control means.

3. An airplane as claimed in claim 1 having a leading edge slat and in which said lift-destroying lateral control means is of the interceptor type having a control element mounted on the wing adapted to be projected above the wing into the air stream rearwardly of and adjacent the slat.

4. An airplane as claimed in claim 1 having a leading edge slat and in which said lift-destroying lateral control means is of the interceptor type having a control element mounted on the wing adapted to be projected above the wing into the air stream rearwardly of and adjacent the slat and having, in addition, aileron lateral control means linked to said lift-destroying lateral control means.

5. An airplane as claimed in claim 1 having a leading edge slat and in which said lift-destroying lateral control means is of the interceptor type having a control element mounted on the wing adapted to be projected above the wing into the air stream rearwardly of and adjacent the slat and having, in addition, aileron lateral control means linked to said lift-destroying lateral control means, and in which said horizontal tail has an adjustable trim tab.

6. In a fixed-wing powered airplane having a maximum lift coefficient of the order of 2.5 or more and capable of low-speed flight, in combination, lift-destroying lateral control means and lateral control operating means therefor, pitch control means and pitch control operating means therefor, said pitch control means including an all-moving unitized horizontal tail with an anti-balance tab carried on said tail and arranged to be displaced with respect to said tail and means responsive to movement of said tail for causing said tab to be displaced relatively to said tail and in a direction to produce a hinge moment in a direction opposite to the movement of said tail providing free control longitudinal stability, said horizontal tail and said tab beng rotatable as a unit about a transverse horizontal axis and always having coincident zero lift and chord lines, whereby the greatest and most rapid changes of wing down-wash due to propeller slipstream-wing interaction power-on and power-off, at low air speed high lift-coefficient flight conditions may be rapidly and directly compensated for by a single movement of said pitch control operating means, said combination of control means providing full lateral and longitudinal control and maneuverability at all air speeds.

References Cited in the file of this patent

UNITED STATES PATENTS

| 1,862,902 | McDonnell, Jr. | June 14, 1932 |
| 1,976,482 | Child | Oct. 9, 1934 |
| 2,541,704 | Koppen | Feb. 13, 1951 |
| 2,557,426 | George | June 19, 1951 |
| 2,563,757 | Thorp | Aug. 7, 1951 |

FOREIGN PATENTS

| 665,316 | Germany | Sept. 29, 1938 |